United States Patent
Wang et al.

(10) Patent No.: US 9,773,302 B2
(45) Date of Patent: Sep. 26, 2017

(54) THREE-DIMENSIONAL OBJECT MODEL TAGGING

(71) Applicant: Hewlett-Packard Development Company, L.P., Houston, TX (US)

(72) Inventors: Su Wang, Palo Alto, CA (US); Hung-Shuo Tai, Palo Alto, CA (US); Divya Sharma, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 78 days.

(21) Appl. No.: 14/878,889

(22) Filed: Oct. 8, 2015

(65) Prior Publication Data

US 2017/0103510 A1    Apr. 13, 2017

(51) Int. Cl.
*G06K 9/40* (2006.01)
*G06K 9/48* (2006.01)
*G09G 5/02* (2006.01)
*G06T 5/00* (2006.01)
*G06T 7/00* (2017.01)
*G06T 17/00* (2006.01)
(Continued)

(52) U.S. Cl.
CPC ............ *G06T 7/0002* (2013.01); *G06T 7/002* (2013.01); *G06T 7/0085* (2013.01); *G06T 7/408* (2013.01); *G06T 17/00* (2013.01); *H04N 13/025* (2013.01); *G06T 2200/24* (2013.01); *G06T 2207/10028* (2013.01)

(58) Field of Classification Search
CPC ......... G06T 7/0075; G06T 2207/10012; G06T 7/0002; G06T 7/0038; G06T 7/408; G06T 7/0081; G06T 7/602; G06T 2207/10028; G06T 2207/30168; G06T 2207/20144; G06T 2207/20021; H04N 13/0239; H04N 13/025; H04N 13/0246
USPC ....... 382/154, 162, 168, 166, 169, 173, 181, 382/190, 199, 203, 232, 237, 250, 254, 382/276; 345/419, 420–428, 589, 597
See application file for complete search history.

(56) References Cited

U.S. PATENT DOCUMENTS 6,256,038 B1 *   7/2001   Krishnamurthy ..... G06T 11/203
                                                                    345/419
7,813,591 B2 *  10/2010   Paley .................... A61B 5/4547
                                                                    345/418
(Continued)

FOREIGN PATENT DOCUMENTS

WO    WO-2014055355 A2    4/2014

OTHER PUBLICATIONS

Izadi, et al., "KinectFusion: Real-time 3D Reconstruction and Interaction Using a Moving Depth Camera" UIST'11, Oct. 16-19, 2011 (10 pgs).
(Continued)

*Primary Examiner* — Sheela C Chawan
(74) *Attorney, Agent, or Firm* — Brooks, Cameron & Huebsch PLLC (57) ABSTRACT

In one implementation, a system for three-dimensional object model tagging includes a model engine to generate a model of a three-dimensional (3D) object from a pre-scan of a 3D object; an analysis engine to analyze the model to identify a property of the 3D object predictive of a reconstruction of the 3D object; a tag engine to generate a tag that describes the identified property based on the analysis; and a display engine to display the tag.

11 Claims, 2 Drawing Sheets

(51) Int. Cl.
    *G06T 7/40*      (2017.01)
    *H04N 13/02*     (2006.01)

(56) References Cited

U.S. PATENT DOCUMENTS

| | | | | |
|---|---|---|---|---|
| 7,835,568 B2* | 11/2010 | Park | ................. | G06T 17/10 |
| | | | | 382/154 |
| 8,050,491 B2* | 11/2011 | Vaidyanathan | ......... | G06T 17/10 |
| | | | | 345/419 |
| 8,213,707 B2* | 7/2012 | Li | ................. | G01B 11/2504 |
| | | | | 345/419 |
| 8,452,081 B2* | 5/2013 | Wang | ................. | G06T 15/205 |
| | | | | 382/154 |
| 9,053,571 B2* | 6/2015 | Shotton | ................. | G06T 17/10 |
| 9,208,607 B2* | 12/2015 | Chu | ................. | G06T 17/00 |
| 9,361,553 B1* | 6/2016 | Ito | ................. | G06T 19/20 |
| 2006/0003111 A1 | 1/2006 | Tseng | | |
| 2009/0061381 A1 | 3/2009 | Durbin et al. | | |
| 2011/0157229 A1* | 6/2011 | Ni | ................. | H04N 13/0011 |
| | | | | 345/646 |
| 2012/0243774 A1 | 9/2012 | Chen et al. | | |
| 2015/0032242 A1* | 1/2015 | Schouwenburg | ... | B29C 67/0088 |
| | | | | 700/98 |

OTHER PUBLICATIONS

Rusinkiewicz, et al., "Real-Time 3D Model Acquisition" Princeton and Stanford University (9 pgs).

\* cited by examiner

THREE-DIMENSIONAL OBJECT MODEL TAGGING

BACKGROUND

Three-dimensional (3D) scanning is useful for analyzing a real world object and constructing a digital model of that object. For example, 3D scanning may be used in the entertainment industry for digital productions such as movies and video games. Additional examples may include using 3D scanning in industrial design, prototyping, and quality control applications.

DETAILED DESCRIPTION

A number of methods, systems, and computer readable medium for scan recommendations are described herein. 3D scanning may be a time and resource consuming process. To scan a 3D object may involve capturing multiple images of the object and/or data relating the object. For example, a 3D scan of a 3D object may involve a series of high resolution image captures of the object. Completing these captures can consume a significant amount of time and/or computing resources.

Further, the 3D scans may not produce an accurate reconstruction (e.g., digital reconstruction and/or physical reconstruction as is the case in 3D additive manufacturing) of the 3D object depending on properties of the 3D object to be scanned. An accuracy of a reconstruction of a 3D object may be determined based on how similar the physical 3D object and the reconstruction of the 3D object appear visually. The accuracy of the reconstruction of any 3D object may be affected by its size, shape, color, and or other physical feature.

In some examples the reconstruction of a 3D object from a 3D scan of the object may be so inaccurate as to be unacceptable as a digital model or for 3D printing (e.g., computer assisted additive manufacturing). For example, the reconstruction from the 3D scan of a 3D object may be unacceptable when the 3D reconstruction is missing various components of the original 3D object do to a failure to accurately detect and/or faithfully reproduce the surface of the object in the 3D reconstruction. As a result, the scan may need to be re-performed with adjusted parameters, wasting valuable time and resources. In some examples, the object cannot be scanned at all, especially if the surface is relatively dark, reflective or transparent.

In contrast, examples herein may include performing a pre-scan of a 3D object, generating a model of the 3D object from the pre-scan, analyzing the model to identify a property of the 3D object predictive of a reconstruction of the 3D object, generating a tag that describes the identified property based on the analysis, and displaying the tag.

As used herein, a 3D object may be any object which may be scanned by a 3D scanning device. As a further example, a 3D object may be any object that has a height, width, and depth as a first, second, and third dimension. As used herein, a scanning device or a scanner may be any device that analyzes a real-world object (e.g., a 3D object) to collect data about its volume, shape and/or appearance. The scanner may be a sensor assembly utilized for various image-capturing operations (e.g., pre-scan, full scan, etc.). The scanner may be a device with an attached camera, projector, light source, and/or other suitable devices or combinations thereof. For example, a scanning device can include a depth-sensor camera and/or a red, green, blue (RGB) camera. The scanning device may be used to generate and transmit a plurality of image captures of the 3D object. The system may then analyze the image captures of the 3D object and generate a tag that describes a property of the 3D object, as is further described herein. The tag may be utilized to identify and/or describe a potential problem such as a particular identified property that can degrade the accuracy of a reconstruction of the 3D object. The system may then display the tag.

Figure 1:
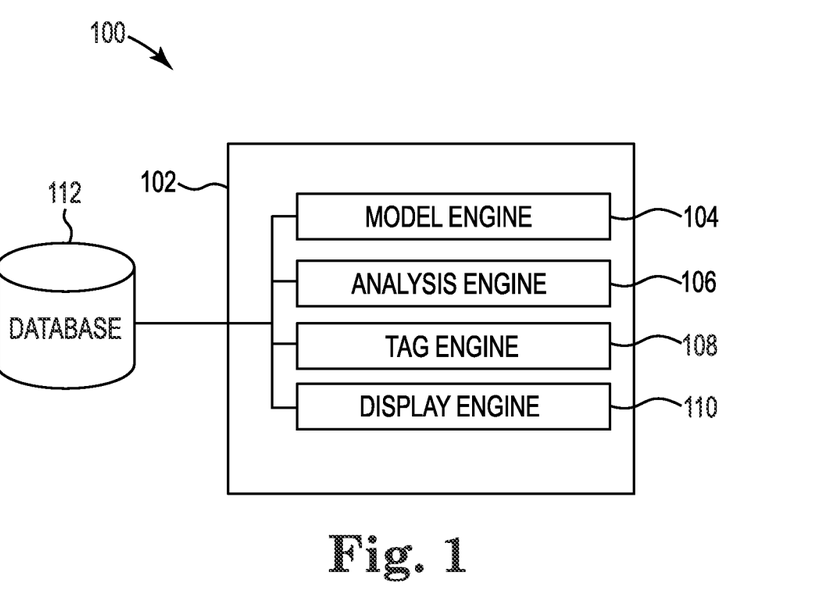
FIG. 1 illustrates a diagram of an example of a system for 3D object model tagging consistent with the present disclosure.
Figure 2:
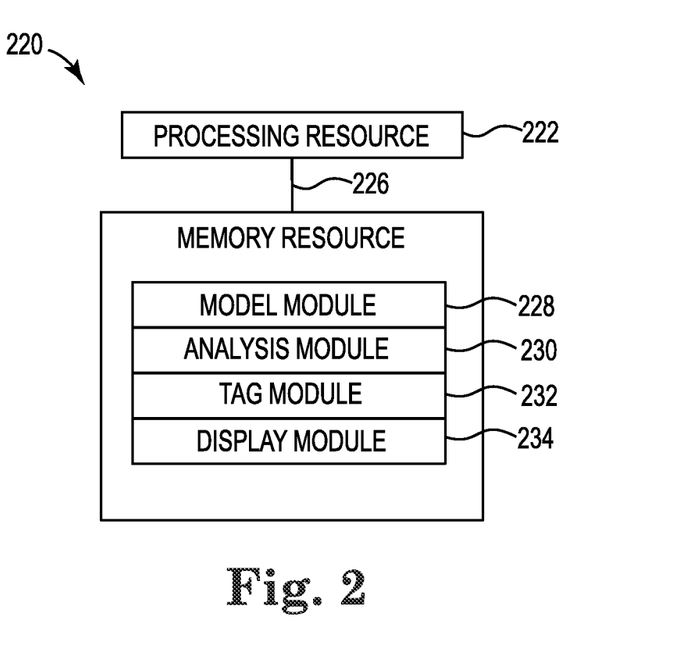
FIG. 2 illustrates a diagram of an example computing device consistent with the present disclosure.

FIGS. 1 and 2 illustrate examples of system 100 and computing device 220 consistent with the present disclosure. FIG. 1 illustrates a diagram of an example of a system 100 for 3D object model tagging consistent with the present disclosure. The system 100 can include a database 112, a 3D object model tagging system 102, and/or a plurality of engines (e.g., model engine 104, analysis engine 106, tag engine 108, display engine 110). The 3D object model tagging system 102 may be in communication with the database 112 via a communication link, and can include the plurality of engines (e.g., model engine 104, analysis engine 106, tag engine 108, display engine 110). The 3D object model tagging system 102 can include additional or fewer engines that are illustrated to perform the various elements as are described in further detail in connection with FIG. 3.

The plurality of engines (e.g., model engine 104, analysis engine 106, tag engine 108, display engine 110) can include a combination of hardware and machine readable instructions (e.g., stored in a memory resource such as a non-transitory machine readable medium) that are executable using hardware components such as a processor, but at least hardware (e.g., a circuit), to perform elements described herein (e.g., generate a model of a three-dimensional (3D) object from a pre-scan of a 3D object, analyze the model to identify a property of the 3D object predictive of a reconstruction of the 3D object, generate a tag that describes the identified property based on the analysis, display the tag, etc.).

The model engine 104 may include hardware and/or a combination of hardware and machine readable instructions, but at least hardware, to receive a plurality of image captures of a three-dimensional (3D) object from a scanner. As used herein, the plurality of image captures of the 3D object may include depth maps and color information. The depth maps may be utilized to generate point clouds and estimate its volume, as is further described herein. The color information may be utilized to determine properties (e.g., material characteristics) of the 3D object, as is further described herein.

The plurality of image captures received from the scanner may be captured during a pre-scan operation of the scanning device. As used herein, a pre-scan may include a series of image captures performed at a faster rate and a lower resolution than a subsequent full scan performed at a slower rate and a higher resolution. That is, the pre-scan may be an abbreviated process of capturing images of a 3D object as compared to the full scan. The pre-scan may utilize an image capturing device having a lower capture resolution than an image capturing device utilized in a subsequent scan and/or the pre-scan may utilize the same device utilized in a subsequent scan calibrated to capture lower-resolution images during a pre-scan. The pre-scan may include the fewer, the same as, or more image capture angles of the 3D object. The pre-scan may be faster than a subsequent full scan. The pre-scan may collect less data associated with an image capture (e.g., lower resolution) at fewer image capture angles, thereby abbreviating the time associated with completing the pre-scan as compared with the subsequent full scan which may capture more data associated with an image capture (e.g., higher resolution) at relatively more image capture angles. The pre-scan may provide a preview of the subsequent full scan. That is, the pre-scan may provide a visual representation of aspects of what the final subsequent full scan will look like. The pre-scan may also guide the full scan process as to a minimum number of captures to capture the object geometry in an efficient way.

The plurality of pre-scan image captures received from the scanner may each correspond to a different object orientation. That is, each of the plurality of image captures can include an image captured from a particular viewing angle of the 3D object. In some examples, the image capturing scanning devices may be substantially fixed and the 3D object may be rotated and/or the 3D object may be placed on a turntable that rotates the 3D object. The turntable may also be capable of tilting, which may expose various surfaces and viewing angles of the object to the scanner. Each of the plurality of image captures may correspond to a respective unique rotation angle of the 3D object relative to the scanning device. The plurality of rotation angles corresponding to each of the plurality of image captures may be a predetermined parameter of the pre-scan. In an example where the 3D object rests on a turntable during scanning, the rotation angles may correspond to the angle of the rotation of the turntable relative to a 360-degree axis to complete a revolution. In some examples, the turntable may be angled such that it has a horizontal slant (e.g., an approximate 15-degree horizontal elevation from one side of the turntable to the other).

The image capturing scanning device may include a sensor assembly, which may include a depth-sensor camera, an infrared camera, and/or a red, green, blue (RGB) camera. As described above, more than one image capturing scanning device may be utilized in the capture of images of the 3D object. The image capturing scanning device may also include a stereo pair of RGB cameras, which may generate depth at a relatively faster rate but at a relatively lower resolution to other image capturing scanning components of the sensor assembly. In some examples, different image capturing scanning device may be used for a pre-scan and a subsequent full scan.

The model engine 104 may also include hardware and/or a combination of hardware and machine readable instructions, but at least hardware, to generate a model of a 3D object from the pre-scan of a 3D object. Generating a model of a 3D object may include fusing data extracted from the plurality of images captured. Fusing data can include incorporating and aligning data from the plurality of image captures into a digital model of the 3D object. The model may be a 3D model of the 3D object.

At each rotation angle the relatively low resolution RGB camera may collect a two-dimensional (2D) image representing depth or point cloud of the 3D object including the color data for the 3D object. 2D object segmentation of the 3D object may be performed on each of the 2D RGB and depth images. The 2D images may be aligned to create a representative model of the 3D image from multiple views. The RGB data may be utilized for texture rendering for the model. Further, a point cloud corresponding to the 3D object may be extracted. The point cloud may be a set of data points in a three-dimensional coordinate system where the points of the point cloud are each defined by an X, Y, and Z coordinate. The points of the point cloud may correspond to points on the external surface of the 3D object as captured by the image capturing scanning device. In some examples, the point cloud may be extracted from images of the 3D object captured by the depth camera and/or infrared camera image capturing scanning devices. Fusing of the data may include mapping each point in the point cloud to a portion of a 2D RGB image/s and/or texture map of the 3D object. A texture map may include a bitmap or raster image illustrating surface texture and/or color to computer-generated 3D model. A texture map may be applied by interpolation to a surface of a 3D model. A 3D model with a texture map applied may include texture pixels corresponding to the pixels of the digital 3D model.

The analysis engine 106 may include hardware and/or a combination of hardware and machine-readable instructions, but at least hardware, to analyze the model to identify a property of the 3D object predictive of a reconstruction of the 3D object. Analyzing the model may include performing an analysis of the size, shape, color, contours, boundary regularity, and other features of the 3D object being scanned.

For example, analyzing may include performing a boundary analysis of the 3D object based on the model. The regularity of the boundary of the 3D object may be analyzed. The analysis of the regularity of the 3D object may include determining a smoothness of the boundary of the 3D object represented in the model. The boundary analysis may be performed on the aligned 2D images captured by the 2D RGB image capture scanning device and/or a texture map of the 3D object.

Analyzing the model may also include analyzing the color of the 3D object based on the model. Analyzing the color of the 3D object may include analyzing the amount and/or percentage of dark coloration (e.g., black, etc.) of an object. Analyzing the color may also include analyzing the color saturation of the model of the 3D object. In this manner, the shininess of the 3D object may be determined. The boundary analysis may be performed on the aligned 2D images captured by the 2D RGB image capture scanning device and/or a texture map of the 3D object.

Analyzing the model may include analyzing the volume of the 3D object based on the model. Analyzing the size of the 3D object may be performed on the point cloud portion of the model, such as by quantifying a number of points within a given model of a 3D object and/or quantifying the volume of a 3D object based on the point cloud. For example, the volume of the 3D object may be quantified by superimposing a cylinder and/or cuboid bounding structure encompassing the point cloud. The parameters of the cylinder and/or a cuboid encompassing the point cloud may be calculated, and the calculated parameters may be utilized to yield an estimation of the volume of the 3D object (e.g., by calculating a volume of a bounding structure).

As described above, the analysis of the model may be an analysis to identify a property of the 3D object predictive of a reconstruction of the 3D object. A reconstruction of the 3D object may include a digital and/or physical copy of the 3D object reproduced from the images captured of the 3D object and/or the model generated therefrom. As described above, the reconstruction may have varying degrees of accuracy when compared to the 3D object which it replicates. The accuracy of the reconstruction may be affected by a number of properties of the 3D object (e.g., size, shape, color, contours, boundary regularity, symmetry, etc.) and how those properties are captured by an image capturing scanning device. The properties of the 3D object may, therefore, be predictive of the quality and/or accuracy of a reconstruction of a 3D object.

Analyzing the model to identify a property of the 3D object predictive of reconstruction of the 3D object may include comparing the results of the analysis of properties such as size, shape, color, contours, boundary regularity, and symmetry to corresponding predetermined threshold values beyond which the property may degrade the accuracy of the reconstruction.

The tag engine 108 may include hardware and/or a combination of hardware and machine readable instructions, but at least hardware, to generate a tag that describes the identified property based on the analysis. A tag may include a description of the appearance or characteristics of the properties identified by the above described analysis. The tag may be a description of a predicted appearance or characteristics of the identified property of the 3D object based on the above described analysis. The tag may be a warning to a full scan settings manager (e.g., a user, hardware, and/or software) that a property of the 3D object has been identified that may adversely affect the accuracy of the 3D reconstruction of the 3D object utilizing the current and/or default settings for the subsequent 3D full scan.

For example, if the analysis identified that the 3D object has a highly irregular boundary, a "jagged" tag may be generated to describe the irregular appearance. In another example, if the analysis identified that the 3D object has a dark black color covering over thirty percent of its surface, a "dark" tag may be generated to describe the dark appearance. In another example, if the analysis identified that the 3D object has a substantially color saturated surface, a "shiny" tag may be generated to describe a glossy appearance to the surface of the 3D object. In another example, if the analysis identified that the 3D object has a small size (e.g., a few millimeters or centimeters of height, width, and/or length), a "small" tag may be generated to describe size. In another example, if the analysis identified that the 3D object has a substantially symmetric or asymmetric geometry, a "symmetric" or "asymmetric" tag, respectively, may be generated to describe the symmetry of the 3D object.

Alternatively, if the analysis identified that the 3D object has a size, shape, color, contours, boundary regularity are within predetermined bounds and/or have not exceeded a predetermined threshold, a "normal" tag may be generated to describe that the 3D object properties are predicted to be such that they will not adversely affect the 3D reconstruction of the 3D object under the current parameter settings for the subsequent full 3D scan.

The tag may also include information related to adjusting a scan parameter for a subsequent full scan. For example, the tag may, in its description of the identified property, include a description of potential parameter adjustments that could correct and/or ameliorate predicted inaccuracies in the reconstruction of the 3D object. In some examples, the tag may communicate parameter adjustment options to be utilized in a subsequent full scan. In some examples, the tag may include an automatic parameter adjustment to parameters utilized in a subsequent full scan (e.g., a tag may include a command to automatically adjust full scan parameters to predefined settings corresponding to the tag). The tag may also include a recommendation of number of minimum scans to capture a geometry of an object being scanned in the subsequent full scan. For example, once the object geometry is analyzed, depending on whether it is symmetric or asymmetric, a reduced (e.g., relative to a default number) number of scans in case of the former or an increased (e.g., relative to a default number) number of scans in the case of the latter may be recommended for the full-scan operation. In this manner, a full scan operation may be more efficient (e.g., relative to a full scan with default settings) by performing captures only as per the geometry of the object.

The display engine 110 can include hardware and/or a combination of hardware and machine readable instructions, but at least hardware, to display the tag. Displaying the tag may include presenting the tag and/or the description portion of the tag to a user. The tag may be presented to the user via a user interface. As described above, a portion of the tag may include a recommendation of or automatic adjustment to the settings parameters for the subsequent full scan. Display of this portion may include a selectable option to accept the adjusted parameters and/or a selectable option to adjust the parameters automatically on behalf of the user. Display of the tag can include displaying which portions of the model of the 3D object correspond to a given tag. For example, if only a portion of the 3D object is black, then the tag may include an indication of that portion as corresponding to a "dark" tag.

The database 112 can include digital information relating to the 3D object. That is, the database 112 may be utilized to store digital representations (e.g., a 3D model) of the 3D object. For example, the 3D model can include image data (e.g., point clouds, color information, etc.). The database 112 can include the image data of the 3D model.

FIG. 2 illustrates a diagram of an example computing device 220 according to examples of the present disclosure. The computing device 220 can utilize instructions (e.g., software and/or hardware with instructions), hardware, and/or logic to perform a number of tasks including those described herein. The computing device 220 may be a combination of hardware and programming instructions to perform the elements described herein. The hardware, for example, can include a processing resource 222 and/or memory resource 224 (e.g., CRM, MRM, database, etc.).

A processing resource 222, as used herein, may include a processor capable of executing instructions stored by a memory resource 224. Processing resource 222 may be implemented in a single device or distributed across multiple devices. The program instructions (e.g., computer readable instructions (CRI) may include instructions stored on the memory resource 224 and executable by the processing resource 222 to implement a desired task (generate a model of a 3D object from a pre-scan of a 3D object, analyze the model to determine a predicted reconstruction of the 3D object, tag the model with a tag indicating a property of the object based on the predicted reconstruction, display the tag, etc.).

The memory resource 224 may be in communication with the processing resource 222 via a communication link (e.g., a path) 226. The communication link 226 may be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A plurality of modules (e.g., model module 228, analysis module 230, tag module 232, display module 234) can include CRI that when executed by the processing resource 222 can perform elements. The plurality of modules (e.g., model module 228, analysis module 230, tag module 232, display module 234) may be sub-modules of other modules. For example, the analysis module 230 and the tag module 232 may be sub-modules and/or contained within the same computing device. In another example, the plurality of modules (e.g., model module 228, analysis module 230, tag module 232, display module 234) can comprise individual modules at separate and distinct locations (e.g., CRM, etc.).

Each of the plurality of modules (e.g., model module 228, analysis module 230, tag module 232, display module 234) can include instructions that when executed by the processing resource 222 can function as a corresponding engine as described herein. For example, the model module 228 can include instructions that when executed by the processing resource 222 can function as the model engine 104. In another example, the analysis module 230 can include instructions that when executed by the processing resource 222 can function as the analysis engine 106. In another example, the tag module 232 can include instructions that when executed by the processing resource 222 can function as the tag engine 108. In another example, the display module 234 can include instructions that when executed by the processing resource 222 can function as the display engine 110.

The model module 228 can include instructions that when executed by the processing resource 222 may generate, at a computing device 220, a model of a 3D object from a pre-scan of the 3D object. As described above, generating a model of the 3D object may include fusing data extracted from the plurality of images captured. Fusing data may include incorporating and aligning data from the plurality of image captures into a digital model of the 3D object. The model may be a 3D model of the 3D object.

As described above, the plurality of image captures may be images of the 3D object at various rotation angles (e.g., angles of the 3D object relative to an image capturing device) by a 2D RGB camera, a depth camera, and/or an infrared camera. The plurality of image captures may also include the point cloud corresponding to the 3D objected as extracted from the captures of the aforementioned image capturing devices.

The analysis module 230 can include instructions that when executed by the processing resource 222 may analyze, at a computing device 220, the model to determine a predicted reconstruction of the 3D object. Determining a predicted reconstruction of the 3D object may include identifying a property of the 3D object that has a known and/or estimated effect on the accuracy of a reconstruction of the 3D object and predicting the effect of that property on the reconstruction of the particular 3D object. The prediction of the effect on the reconstruction may be based on comparison of the identified property to a number of predetermined thresholds for that property that correspond to predetermined effects on reconstruction of objects. In an example, a property of the 3D object that can influence the accuracy of a reconstruction may be quantified and the resulting value may be compared to predetermined thresholds beyond which particular effects of reconstruction are predicted.

The analysis module 230 may include instructions to extract a boundary of a 3D object from a number of 2D RGB image captures by applying a 2D foreground mask corresponding to the 3D object to the number of 2D RGB images. That is, for each rotation angle a low resolution RGB camera can capture a 2D image, which can include the color information. A 2D object segmentation may be performed to identify a boundary of a 3D object being scanned. After segmentation, a 2D mask with the foreground corresponding to the object may be generated. Applying the mask may allow for extraction of the boundary.

The analysis module 230 may include instructions to perform a boundary analysis on the extracted boundary. Specifically, the regularity of the extracted boundary may be analyzed. The regularity of a portion of the extracted boundary may be quantified. The resulting value corresponding to boundary regularity may be compared to predetermined threshold values to determine which of a number of categories the value and/or the 3D object fits within. These categories may include categories such as normal (substantially regular boundary) and/or jagged (e.g., substantially irregular boundary). Categorization of the boundary regularity property may correspond to a prediction of the reconstruction of the 3D object. For example, determining that the boundary of the 3D object has a jagged visual appearance based on the value comparison may be predictive that the boundary of the 3D object may negatively affect the reconstruction of the 3D object due to an inability of the image capturing scanning device to accurately capture and/or reproduce the irregular boundary aspect of the 3D object.

The 2D image capture devices may capture color information of the scanned 3D object. The color data may be included within the 2D image and may be utilized to generate a color texture map. The analysis module 230 may include instructions to analyze the model by performing a color analysis of a number of 2D RGB image captures of the 3D object. Performing a color analysis of the number of 2D RGB image captures may include identifying dark colors (e.g., black) which may be invisible to the image capturing device such as the depth camera. Since a depth camera may interpret dark colors as invisible, the areas may be reconstructed as black holes or as being occupied by nothing. This may be detrimental to the accuracy of the reconstruction of the 3D object. The analysis may include comparing a dark color percentage of the 3D object to a number of threshold values for dark color percentage. The threshold comparison may determine which of a number of categories the value and/or the 3D object fits within. For example, if the percentage of the 3D object determined by the analysis to be dark is greater than a predetermined threshold amount, the dark percentage value and/or 3D object may be categorized as "dark." If the percentage of the 3D object determined by the analysis to be dark is less than a predetermined threshold amount, the 3D object may be categorized as "normal." Categorization of the dark percentage property of the 3D object may correspond to a prediction of the reconstruction of the 3D object. For example, determining that a 3D object has a dark visual appearance based on the value comparison may be predictive that the color of the 3D object may negatively affect the reconstruction of the 3D object due to an inability of the image capturing scanning device to accurately capture and/or reproduce the dark coloration of the 3D object.

The analysis module 230 may include instructions to perform a color saturation analysis of a number of 2D RGB image captures of the 3D object. A color saturation analysis may include quantifying a color saturation value of portions of the surface of the 3D object determined from the 2D RGB image captures. The color saturation value may be compared to a predetermined color saturation value. The threshold comparison may determine which of a number of categories the color saturation value and/or 3D object fits within. For example, if a portion of the 3D object had substantially full color saturation (e.g., approximately 100 percent) exceeding a predetermined threshold value of color saturation, the color saturation and/or 3D object may be categorized as "shiny." If the color saturation value is below the color saturation predetermined threshold, the object may be categorized as "normal." Categorization of the color saturation property of the 3D object may correspond to a prediction of the reconstruction of the 3D object. For example, determining that a 3D object has a shiny visual appearance based on the value comparison may be predictive that the color saturation of the 3D object may negatively affect the reconstruction of the 3D object due to an inability of the image capturing scanning device to accurately capture and/or reproduce the shiny surface of the 3D object.

The analysis module 230 may include instructions to perform a size (e.g., dimensions, volume, etc.) analysis of the 3D object from the point cloud corresponding to the 3D object. Analyzing the size may include quantifying the size of the object and comparing the resulting size value to a predetermined threshold size value. Quantifying the size of the object may include quantifying the number of points in the point cloud of the object and/or calculating a volume of the object from the dimensions of the surface determined from the points of the point cloud. The threshold comparison may determine which of a number of categories the size value and/or 3D object fits within. For example, if the size value is below a first predetermined threshold the size value and/or 3D object may be categorized as "small," if the size value exceeds the first predetermined threshold size value but is below a second predetermined threshold size value the size value and/or 3D object may be categorized as "medium," and if the size value exceeds the second predetermined threshold size value the size value and/or 3D object may be categorized as "large." Categorization of the size property of the 3D object may correspond to a prediction of the reconstruction of the 3D object. For example, determining that a 3D object has a small visual appearance based on the value comparison may be predictive that the size of the 3D object may negatively affect the reconstruction of the 3D object due to an inability of the image capturing scanning device to accurately capture and/or reproduce the small details of the 3D object.

The analysis module 230 may include instructions to perform a symmetry analysis of the 3D object. The analysis may be performed utilizing the point cloud corresponding to the 3D object and/or the 2D RGB image captures. Analyzing the symmetry may include quantifying the symmetry (e.g., line symmetry/asymmetry, bilateral symmetry/asymmetry, rotational symmetry/asymmetry, etc.) of a surface and/or points upon a surface of the 3d object about a x-axis, a y-axis, and or a z-axis. The quantified symmetry may be compared to a threshold symmetry value. If the quantified symmetry value exceeds the threshold, the object symmetry and/or 3D object may be categorized as "symmetric." If the quantified symmetry value is below a threshold, object symmetry and/or 3D object may be categorized as "asymmetric." Categorization of the symmetry property of the 3D object may correspond to a prediction of the reconstruction of the 3D object. For example, determining that a 3D object is symmetric based on the value comparison may be predictive that fewer scanning operations (e.g., passes of the scanner, instances of image capture, rotation angles, etc.) than a default number may be utilized in the reconstruction of the 3D object. Fewer scanning operations may be utilized due to the ability to reproduce and/or predict data in a symmetrical model of the 3D object. Determining that a 3D object is asymmetric based on the value comparison may be predictive that a greater number of scanning operations (e.g., passes of the scanner, instances of image capture, rotation angles, etc.) than a default number may be utilized in the reconstruction of the 3D object. A greater number of scanning operations may be utilized due to an inability to reproduce and/or predict data in an asymmetrical model of the 3D object.

The categories of the above-mentioned properties may be predictive of a reconstruction of a 3D object. That is, although the categories are a categorization of the properties of the 3D object, they are a categorization of the properties of the 3D object that reflect their predicted effect on the reconstruction of the 3D object. For example, a determination of a boundary as normal or irregular, a dark percentage as dark or normal, a color saturation as shiny or normal, and a size as small, medium, or large is an objective classification to a category corresponding to an effect on the reconstruction of the 3D object. Each of an irregular boundary, a dark object, a shiny object, and a small object may be a category that predict and inaccurate or unacceptable reconstruction under the current and/or planned parameter settings for a subsequent full scan of the 3D object.

The tag module 232 may include instructions to tag, at the computing device 220, the model with a tag indicating a property of the object based on the predicted reconstruction. The tag may be descriptive of the visual appearance of the properties identified and/or categorized by the analysis module 230. The tag can correspond to the category within which the analyzed properties where categorized. For example, the tag corresponding to the boundary regularity property may be "normal" or "jaggy" depending on the results of the analysis. In another example, the tag corresponding to the black percentage property may be "normal" or "dark" depending on the results of the analysis. In another example, the tag corresponding to the color saturation property may be "normal" or "shiny" depending on the results of the analysis. In another example, the tag corresponding to the size property may be "small," "medium," or "large" depending on the results of the analysis. Since the tag is descriptive of the properties that are themselves correlated with a predicted reconstruction of the 3D object, the tag may communicate a warning to a user and/or scan manager of potential reconstruction outcomes.

For example, the tag describing the boundary regularity property and/or 3D object as having a "jaggy" boundary may communicate a warning that reconstruction of the 3D object utilizing the current and/or planned parameter settings for a subsequent 3D scan may suffer from inaccuracies such as an irregular shape not conforming to the original 3D object brought on by the image capturing scanning devices not being able to accurately detect the irregular boundary. Whereas the tag describing the 3D object as normal may communicate that the reconstruction will be normal.

In another example, the tag describing the dark percentage property and/or 3D object as "dark" may communicate a warning that the reconstruction of the 3D object utilizing the current and/or planned parameter settings for a subsequent 3D scan may suffer from inaccuracies such as holes in the reconstruction brought on by the dark colored regions appearing as invisible to the depth camera. Whereas the tag describing the 3D object as normal may communicate that the reconstruction will be normal.

In another example, the tag describing the color saturation property and/or the 3D object as "shiny" may communicate a warning that the reconstruction of the 3D object utilizing the current and/or planned parameter settings for a subsequent 3D scan may suffer from inaccuracies such as inaccurate color rendering in the reconstruction brought on by the color saturated areas appearing as having distorted coloration. Whereas the tag describing the 3D object as normal may communicate that the reconstruction will be normal.

In another example, the tag describing the size property and/or the 3D object as "small" may communicate a warning that the reconstruction of the 3D object utilizing the current and/or planned parameter settings for a subsequent 3D scan may suffer from inaccuracies such as a lack of detail from the 3D object brought on by the 3D object being too small to accurately capture the surface for reproduction utilizing the image capturing scanning devices. Whereas the tag describing the 3D object as medium or large may communicate that the reconstruction will be normal.

The display module 234 may include instructions to display, at a computing device 220, the tag. Displaying the tag may include displaying the description of the visual appearance of a property of the 3D object. In some examples, displaying the tag may include displaying a recommendation of adjustments to parameter scan settings for a subsequent 3D scan to adjust the subsequent scan in order to achieve a more accurate reconstruction of the 3D object.

Figure 3:
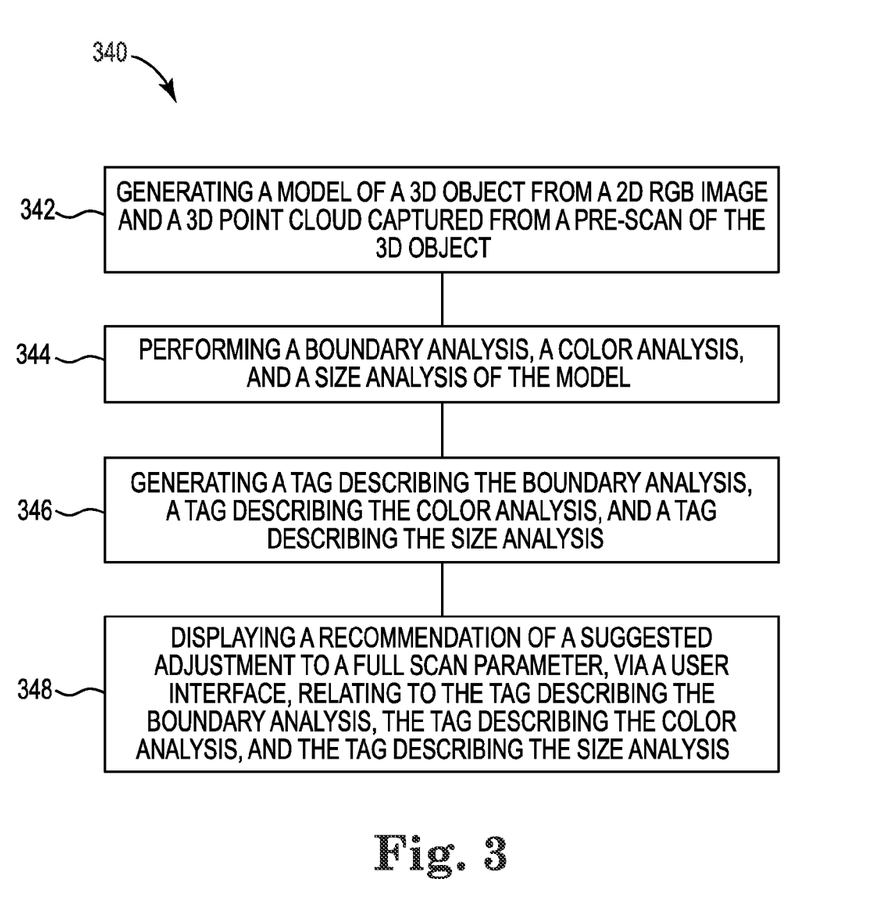
FIG. 3 illustrates a flow chart of an example method of 3D object model tagging consistent with the present disclosure.

FIG. 3 illustrates a flow chart of an example method 340 according to examples of the disclosure. The example method 340 may be implemented using system 100 illustrated in FIG. 1 and/or the computing device 220 illustrated in FIG. 2.

At 342, the method 340 may include generating a model of a 3D object. The model may be generated from fusing data collected from a scan of the 3D object. For example, the model may be generated from a 2D RGB image and a 3D point cloud captured from a pre-scan of the 3D object. As described above, a pre-scan may include a low-resolution rapid scan of the 3D object relative to a subsequent high-resolution slower full scan of the 3D object. In this manner, a pre-scan may assist and/or inform a user and/or scan manager in adjusting scan parameters to generate an accurate reconstruction of the 3D object prior to sitting through the entire full scan.

At 344, the method 340 may include performing a boundary analysis, a color analysis, and a volumetric analysis of the model. The boundary analysis may be performed to quantify the regularity of a boundary of the 3D object. The color analysis may be performed to quantify the amount of dark coloration and/or color saturation of the surface of the 3D object. The size analysis may be performed to quantify the size (e.g., dimensions, volume, etc.) of the 3D object.

The size analysis may be performed utilizing a point cloud corresponding to the 3D object. For example, a depth camera and/or an infrared camera may captured images of the 3D object from a number or rotation angles. The captured images may be aligned to generate a 3D model. Specifically, a point cloud may be extracted from the number of captured images. By utilizing 3D object segmentation point cloud analysis points that do not correspond to the 3D object (background objects) may be removed from the point cloud utilizing a 3D object mask with the 3D object in the foreground. After removing the background or non-3D object points from the point cloud, the number of pints of the point cloud remaining may be utilized to determine the size of the object. Additionally, the size analysis may include estimating the size of the object by superimposing a bounding box (e.g., cylinder shaped, etc.) in a spatial domain in order to capture the number of points in the masked point cloud, the dimensions of the point cloud, and/or the volume of an object with a surface defined by the point cloud, etc.

At 346, the method 340 may include generating a tag describing the boundary analysis, a tag describing the color analysis, and a tag describing the size analysis. For example, the tag may include a textual description of a visual appearance of the boundary, the color (e.g., dark coloration amounts, saturation levels), and the size of the 3D object as determined by the analysis. The tag may include values resulting from the above described analyses. For example, the tag may include a designation of a size value such as a volume of the 3D object as determined by the size analysis. The tag may also include graphical representations illustrating a result of the above described analyses. For example, the tag may include a bounding box as a portion of an estimation of the size of the 3D object. That is, the tag can include a portion of the point cloud within a bounding box estimating the size of the 3D object.

At 348, the method 340 may include displaying a recommendation of a suggested adjustment to a full-scan parameter. A full scan parameter may include any setting of the hardware and/or software associated with capturing the full scan that occurs subsequent to the pre-scan. An example of a full scan parameter may include the rotation angle between image captures. The rotation angle may describe the angle by which the 3-D object being scanned and/or the image capturing scanning device is rotated in order to capture a particular view of the 3D object. In some examples, the rotation angle may be expressed as a number of scan cycles to be utilized in capturing a 360 degree set of scans of the 3D object. In such examples, the higher the number of scans, the more images that will be taken about the 360 degrees of the 3D object and the smaller the rotation angle between those cycles. Another example of a full scan parameter may be a lighting condition for illumination of the 3D object during the full scan. Yet another example of the full scan parameter may be the positioning of the 3D object on a platform or turntable for scanning.

The recommendation of a suggested adjustment to a full scan parameter may be displayed via a user interface. The recommendations may be displayed as a number of selectable options corresponding to full scan parameter adjustments. The tags may relate to the tag describing the boundary analysis, the tag describing the color analysis, and the tag describing the size analysis. That is, the recommendations may include suggested full scan parameter adjustments to accommodate a property of the 3D object. For example, if the tag describing the size analysis describes the 3D object as small, then the recommendation may be a suggested adjustment to a rotation angle parameter to increase the number of scans (thereby decreasing the rotation angles) in order to capture more images of the finer small surface of the 3D object.

In the disclosure, reference is made to the accompanying drawings that form a part hereof, and in which is shown by way of illustration how a number of examples of the disclosure may be practiced. These examples are described in sufficient detail to enable those of ordinary skill in the art to practice the examples of this disclosure, and it is to be understood that other examples may be used and that process, electrical, and/or structural changes may be made without departing from the scope of the disclosure.

The figures herein follow a numbering convention in which the first digit corresponds to the drawing figure number and the remaining digits identify an element or component of the drawing. Elements shown in the various figures herein may be added, exchanged, and/or eliminated so as to provide a number of additional examples of the disclosure. In addition, the proportion and the relative scale of the elements provided in the figures is intended to illustrate the examples of the disclosure, and should not be take in a limiting sense.

As used herein, "logic" is an alternative or additional processing resource to perform a particular action and/or element described herein. Logic can include hardware. The hardware can include processing resources such as circuitry, which are distinct from machine readable instructions on a machine readable media. Further, as used herein, "a" or "a plurality of" something can refer to one or more such things. For example, "a plurality of widgets" can refer to one or more widgets.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed is:

1. A system, comprising:
    a processing resource; and
    a memory resource storing machine readable instructions to cause the processing resource to:
        generate a model of a three-dimensional (3D) object from a pre-scan of the 3D object;
        analyze the model to identify a property of the 3D object predictive of a reconstruction of the 3D object;
        generate a categorical tag that describes the identified property based on the analysis, wherein the categorical tag is based on similarity between the 3D object and the model;
        automatically adjust, without user input, a scan parameter utilized in a subsequent full scan, including a rotation angle, to improve similarity between the 3D object and the model based on the identified property; and
        display the categorical tag.

2. The system of claim 1, wherein the pre-scan includes capturing a series of images of the 3D object with an image capturing device having a lower capture resolution than an image capturing device utilized in the subsequent full scan.

3. The system of claim 2, wherein the tag includes information related to adjusting the scan parameter for the subsequent full scan.

4. The system of claim 1, wherein the pre-scan is a series of image captures of the 3D object at different object orientations corresponding to unique rotation angles of the 3D object relative to a scanning device.

5. The system of claim 4, wherein the scanning device includes:
    a depth-sensor camera; and
    a red, green, blue (RGB) camera.

6. A non-transitory computer readable medium storing instructions executable by a processing resource to cause a computing device to:
    generate, at a computing device, a model of a three-dimensional (3D) object from a pre-scan of the 3D object;
    analyze, at the computing device, the model to determine a predicted reconstruction of the 3D object;
    tag, at the computing device, the model with a tag indicating a property of the object based on the predicted reconstruction, wherein the tag is based on a similarity of the indicated property between the 3D object and the model, and wherein the computing device automatically adjusts, without user input, scan parameters utilized in a subsequent full scan, including a rotation angle, to improve similarity of the indicated property between the 3D object and the model;
    display, at the computing device, the tag.

7. The medium of claim 6, comprising instructions to analyze the model by extracting a boundary of the 3D object from a number of two-dimensional (2D) red green blue (RGB) image captures by applying a 2D foreground mask corresponding to the 3D object to the number of 2D RGB image captures.

8. The medium of claim 7, comprising instructions to analyze the model by performing a boundary analysis of a regularity of the extracted boundary.

9. The medium of claim 6, comprising instructions to analyze the model by performing a color analysis of a number of two-dimensional (2D) red green blue (RGB) image captures of the 3D object.

10. The medium of claim 6, comprising instructions to analyze the model by performing a color saturation analysis of a number of two-dimensional (2D) red green blue (RGB) image captures of the 3D object.

11. The medium of claim 6, comprising instructions to analyze the model to determine the predicted reconstruction of the 3D object based on a value determined by the analysis of the model as compared to a predetermined threshold value.

* * * * *